United States Patent
Westing et al.

(10) Patent No.: US 7,891,728 B2
(45) Date of Patent: Feb. 22, 2011

(54) MOTOR VEHICLE (75) Inventors: Franz Westing, Hasbergen (DE); Andreas Bente, Hörstel (DE); Vinzenz Partmann, Wietmarschen (DE)

(73) Assignee: Wilhelm Karmann GmbH, Osnabruck (DE)

( * ) Notice: Subject to any disclaimer, the term of this patent is extended or adjusted under 35 U.S.C. 154(b) by 327 days.

(21) Appl. No.: 11/568,128

(22) PCT Filed: Apr. 15, 2005

(86) PCT No.: PCT/DE2005/000691

§ 371 (c)(1),
(2), (4) Date: Nov. 17, 2006

(87) PCT Pub. No.: WO2005/102824

PCT Pub. Date: Nov. 3, 2005

(65) Prior Publication Data

US 2008/0231085 A1    Sep. 25, 2008

(30) Foreign Application Priority Data

Apr. 20, 2004   (DE) .................. 10 2004 018 977

(51) Int. Cl.
*B62D 21/06* (2006.01)

(52) U.S. Cl. .................. 296/204; 280/793; 296/181.4

(58) Field of Classification Search ................. 180/311; 280/781, 784, 793, 794; 296/181.4, 204
See application file for complete search history.

(56) References Cited

U.S. PATENT DOCUMENTS

| 1,483,650 | A | * | 2/1924 | Corbin, Jr. ............... 296/181.4 |
| 1,577,060 | A | * | 3/1926 | Day .......................... 280/794 |
| 1,591,215 | A | * | 7/1926 | Jacobs ....................... 280/794 |
| 2,080,748 | A | * | 5/1937 | Slack ......................... 280/793 |
| 2,141,635 | A | * | 12/1938 | Einar ........................ 280/794 |
| 2,144,889 | A | * | 1/1939 | Moodie ...................... 296/204 |
| 2,228,411 | A | * | 1/1941 | Sheridan .................... 180/305 |
| 2,441,106 | A | * | 5/1948 | Theriault ................... 296/204 |
| 2,964,331 | A | * | 12/1960 | Sherman .................... 280/790 |
| 3,073,647 | A | * | 1/1963 | Beltz ......................... 296/204 |
| 4,950,026 | A | * | 8/1990 | Emmons ................ 296/203.01 |
| 5,074,587 | A | * | 12/1991 | Schwede et al. ........... 280/781 |
| 5,259,661 | A | * | 11/1993 | Thum ........................ 296/204 |
| 5,374,081 | A | * | 12/1994 | Schoderer et al. .......... 280/788 |

(Continued)

FOREIGN PATENT DOCUMENTS

JP    06144300 A  *  5/1994

*Primary Examiner*—Glenn Dayoan
*Assistant Examiner*—Paul A Chenevert
(74) *Attorney, Agent, or Firm*—Quinn Law Group, PLLC (57) ABSTRACT A motor vehicle, especially a cabriolet vehicle, with a motor vehicle chassis is provided to whose underbody area at least two reinforcing struts are allocated, each of which trends from a chassis attachment with a component in the direction of a vertical longitudinal mid-plane. A connection support is provided free under the underbody and with a distance to it, at which support two of these struts are held in close distance to each other with respect to the vehicle transverse direction, as well as two further struts, which from there extend away, in each case, with a component in the direction of the vertical longitudinal mid-plane, wherein the connection support is angled about at least one axis extending transverse to the vehicle between the mountings for the two struts and the mountings for the two further struts.

13 Claims, 8 Drawing Sheets

U.S. PATENT DOCUMENTS

| | | | |
|---|---|---|---|
| 5,417,454 A * | 5/1995 | Adams | 280/794 |
| 5,803,533 A * | 9/1998 | Schulz et al. | 296/204 |
| 6,099,039 A * | 8/2000 | Hine | 280/781 |
| 6,131,685 A * | 10/2000 | Sakamoto et al. | 180/232 |
| 6,206,460 B1 * | 3/2001 | Seeliger et al. | 296/204 |
| 6,357,769 B1 * | 3/2002 | Omundson et al. | 280/124.109 |
| 6,619,730 B2 * | 9/2003 | Porner | 296/204 |
| 6,679,523 B2 * | 1/2004 | Yamamoto et al. | 280/785 |
| 6,979,023 B2 * | 12/2005 | Mikasa et al. | 280/781 |
| 6,986,401 B2 * | 1/2006 | Chernoff et al. | 180/311 |
| 7,090,290 B2 * | 8/2006 | Neumeier et al. | 296/204 |
| 7,204,519 B2 * | 4/2007 | Kubo et al. | 280/781 |
| 7,273,230 B2 * | 9/2007 | Kiel et al. | 280/781 |
| 7,648,195 B2 * | 1/2010 | Stock-Hausen-Petersen et al. | 296/204 |
| 2003/0011184 A1 * | 1/2003 | Sonomura et al. | 280/784 |
| 2004/0108754 A1 * | 6/2004 | Igarashi et al. | 296/204 |
| 2004/0239150 A1 * | 12/2004 | Fukudome et al. | 296/193.07 |
| 2005/0110303 A1 * | 5/2005 | Neumeier et al. | 296/204 |
| 2006/0066138 A1 * | 3/2006 | Okana et al. | 296/204 |
| 2006/0197331 A1 * | 9/2006 | Davis et al. | 280/781 |
| 2007/0205635 A1 * | 9/2007 | Bunsmann et al. | 296/204 |
| 2007/0284175 A1 * | 12/2007 | Misaki et al. | 180/296 |
| 2008/0315572 A1 * | 12/2008 | Hashimura et al. | 280/782 |

* cited by examiner

MOTOR VEHICLE

CROSS-REFERENCE TO RELATED APPLICATION(S)

This application is a US National Phase of International Application No. PCT/DE 2005/000691, filed Apr. 15, 2005, which claims priority to German 10 2004 018 977.3, filed Apr. 20, 2004. The entire contents of the above identified applications are incorporated herein by reference.

TECHNICAL FIELD

The invention relates to a motor vehicle, especially a cabriolet vehicle, with struts associated with its underbody area.

BACKGROUND OF THE INVENTION

With motor vehicles there is the problem, in general, that outside stimuli of vibrations occurring during driving operation, such as when driving over uneven roadways, for example potholes or upwards projecting swells, can cause undesired vibrations and torsions of the chassis. Thus, driving safety and comfort can be impacted and the vehicle structure can be placed under strain. This problem occurs notably in cabriolet vehicles having an integral body-frame, which, due to the non-rigid roof, which especially in the open state cannot reinforce the chassis, have a stability disadvantage in comparison with closed vehicle bodies. In particular, noticeable torsions of the vehicle can occur around a longitudinal axis located in the direction of travel. In principle, the problem is more or less pronounced for all vehicle types.

It is known, in the underbody area to allocate separate, reinforcing struts to the chassis, of which, for example, one strut pair can extend from the outer edge area, in the vehicle transverse direction, in front of the rear wheel arch to an area lying further inward in proximity to a vertical vehicle longitudinal mid-plane behind the rear wheel arch, and can be fixed there to a spare wheel well provided with webs, beading, or similar bracing.

For vehicles with a low lying rear axle or other special geometric characteristics, the difficulty occurs that the struts usually lying horizontally under the bottom would hit on an obstacle, and the prior possibility of strut localization on the underbody is more difficult, or is completely impossible.

DE 102 14 372 C1 shows a vehicle in which two struts, which run toward the rear up to a vehicle transverse middle, are fixed with their backward ends on the chassis via a connection area. The connection area is, with respect to the vehicle longitudinal direction towards the back, fixed via three mounts to the chassis in proximity to the vehicle transverse middle. Thereby, the supports counteract a bending stress around a horizontal axis lying transverse to the vehicle. Additionally, a rear strut pair is provided, which likewise on one end is held at the connection area, and is intended to counteract a torsional stress of the vehicle about a vehicle longitudinal axis. However, for torsion the system is over-determined. Elongation or compression strains introduced via one of the forward struts are counteracted in part via a bending of the connection area, and in a further part via the supports lying in the vehicle transverse middle, where the supports on the basis of their proximity to the vehicle transverse middle offer no effective support against torsions, and only a further part of the introduced force is picked up by the struts. Therefore, the reduction of the torsions is degraded. In addition, for adverse chassis conditions, such as a low-lying rear axle, such a construction cannot be assembled.

SUMMARY OF THE INVENTION

The objective of the invention is to broaden the possibilities for the course of the struts and their connection to the chassis for a motor vehicle.

With the freely suspended arrangement of the connection support beneath the underbody, an optimal counteraction results against the torsional deformations of the vehicle occurring about a longitudinal axis. The connection support requires no further connection beyond the struts that are held there and respectively run toward the transverse vehicle edges. Due to the spacing of the connection support to the underbody, this is also installable in adverse chassis conditions, and can also, in particular, be located in front of a rear axle in the direction of travel. Whether the projection of the struts in the horizontal plane form a large or small angle outgoing from the connection support has no effect at all on the minimization of the torsion. Furthermore, through the close spacing of the strut ends to the connection support in relation to the vehicle transverse direction, it is assured that the connection support will not be subject to bending stress.

The latter is especially true when the spacing of the strut mountings at the connection support in the vehicle transverse direction is less than 120 millimeters.

Because the connection support is angled about at least one axis extending transverse to the vehicle between the mountings for two struts and the mountings for two additional struts, the front and rear struts do not need to lie in the same plane, instead the rear struts can, for example, trend sharply upwards from the connection support, such that they can be fixed, for example, at a cross support lying in front of the rear axle in the direction of travel.

The avoidance of a bending stress results, in particular, when the spacing of the strut mountings at the connection support in the vehicle transverse direction is less than 120 millimeters.

With this, a particularly effective cancellation of the torsion is achieved when the rear pair of struts is fixed to a transverse support of the chassis by connection flanges that encompass the supports at least in areas on the front and back sides.

It is also possible that the struts are formed to be vibration selective, and associated with these are a pick-up unit for the take-up of longitudinal stresses occurring during driving, and at least one actuator element for effecting a force to counteract the longitudinal stresses, so that an active stabilization of the vehicle against outside stimuli is possible.

Further advantages and features of the invention arise from a practical example of the object of the invention represented in the drawings and described in the following.

DESCRIPTION OF THE PREFERRED EMBODIMENTS

Figure 1:
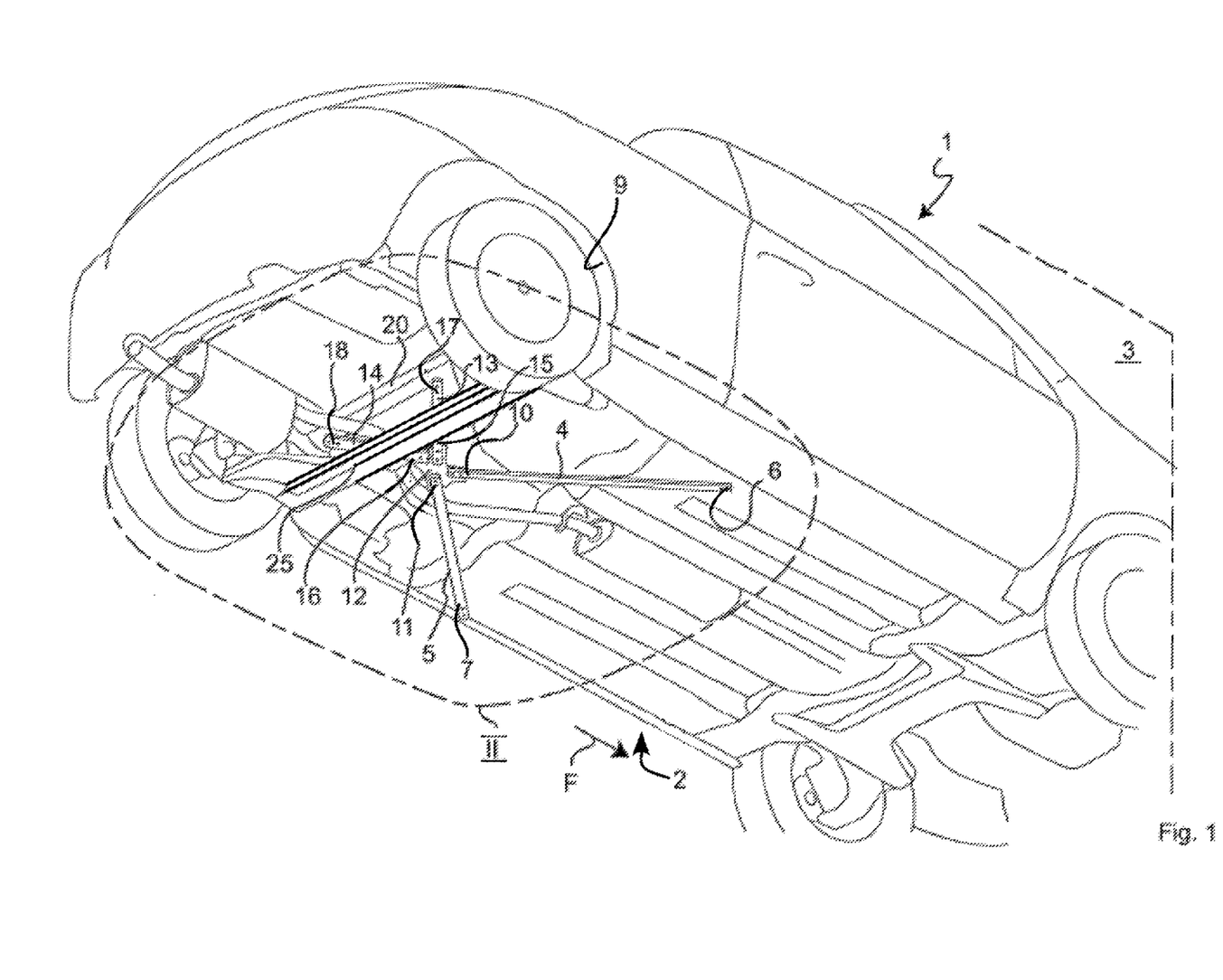
FIG. 1 a schematic, perspective view of an underbody area of a motor vehicle formed/constructed according to the invention, FIG. 2 an enlarged view of the detail II in FIG. 1, FIG. 3 a similar view to FIG. 2, however, instead of the front struts, associated force vectors are shown, FIG. 4 a detailed view from below of the strut arrangement according to FIG. 2, FIG. 5 the area according to FIG. 2 in a perspective view, obliquely from below, FIG. 6 a similar view to FIG. 5, without the chassis parts shown, FIG. 7 a detailed view corresponding to the section VII in FIG. 6, FIG. 8 a side elevation view of the axle and strut arrangement according to FIG. 2.
Figure 2:
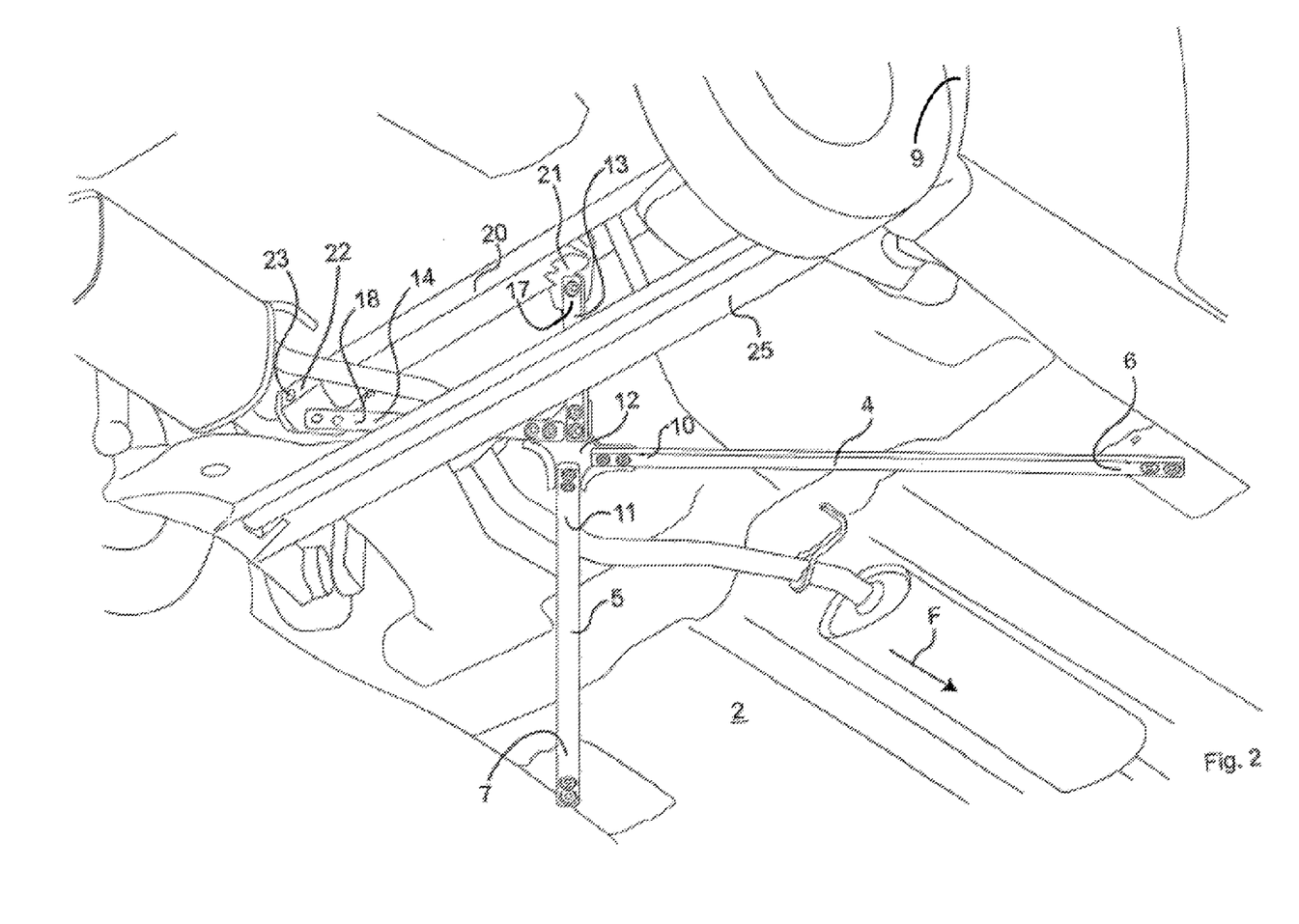

In the illustrated practical example according to FIG. 1, a first pair of bracing struts 4, 5 that are at least nearly symmetrical about a vertical longitudinal mid-plane 3, is associated, at least in the rear half of the vehicle, with the underbody 2 of a vehicle 1—here a cabriolet vehicle, which is not essential. In addition, further struts can lie in the front area of the vehicle. The number and symmetrical arrangement of the struts 4, 5 shown in the drawing are only to be viewed as an example, as is their trend.

The struts 4, 5 here are mounted via brackets, in each case, with their forward ends 6, 7 in the direction of travel F, to the underbody 2 of the vehicle 1 in its outer transverse edge area, for example, at side beams. In the present practical example, they are detachably screwed to the underbody 2, to which end above the underbody 2 there are provided, in each case, abutments—not shown—that are separate and supplied with internal threads. Also, a riveting or welding can be considered.

The struts 4, 5 extend in their trend from their forward ends 6, 7 in front of the rear wheel arches 9 up to the rear ends 10, 11, which, with respect to the direction of travel F, can lie behind or even in front of the wheel arches 9, with a component toward the vertical longitudinal mid-plane 3. The struts 4, 5 can be formed, for example, as flat steel or profiles, such as tubular or rectangular profiles, from metal, or also, for instance, from fiber reinforced plastics. The ends 6, 7, 10, 11 can be compressed, also for profile struts 4, 5, in order to simplify the reach-through of fastening means. The form of the struts 4, 5 can deviate significantly from the straight-line form shown here. Also, components that are somewhat angled and/or flat in areas can be considered as struts.

The rear ends 10, 11 of the struts 4, 5 are attached at a common connection support 12, which is lying underneath the underbody 2, and with a vertical offset from it.

Figure 4:
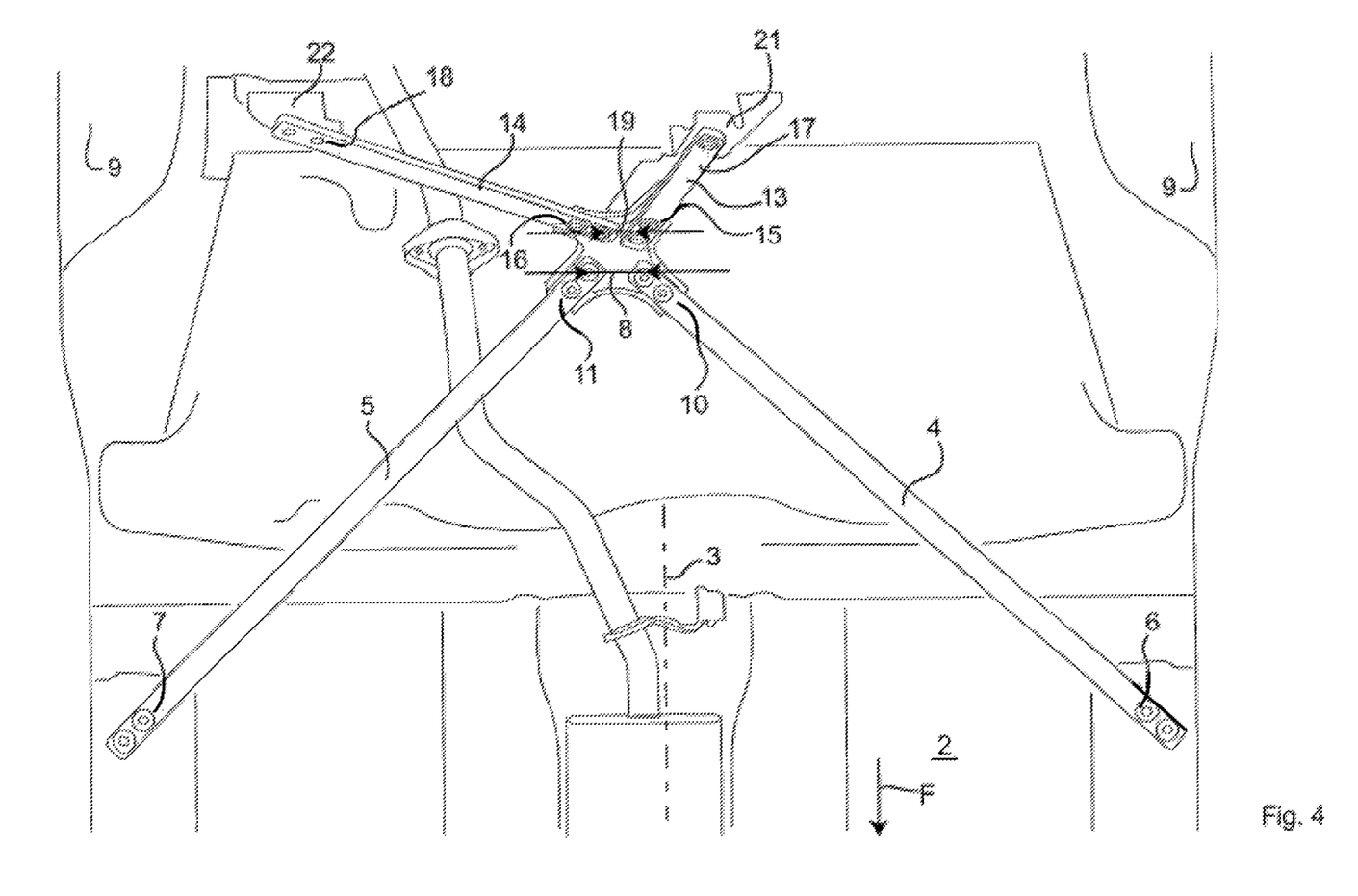
Figure 5:
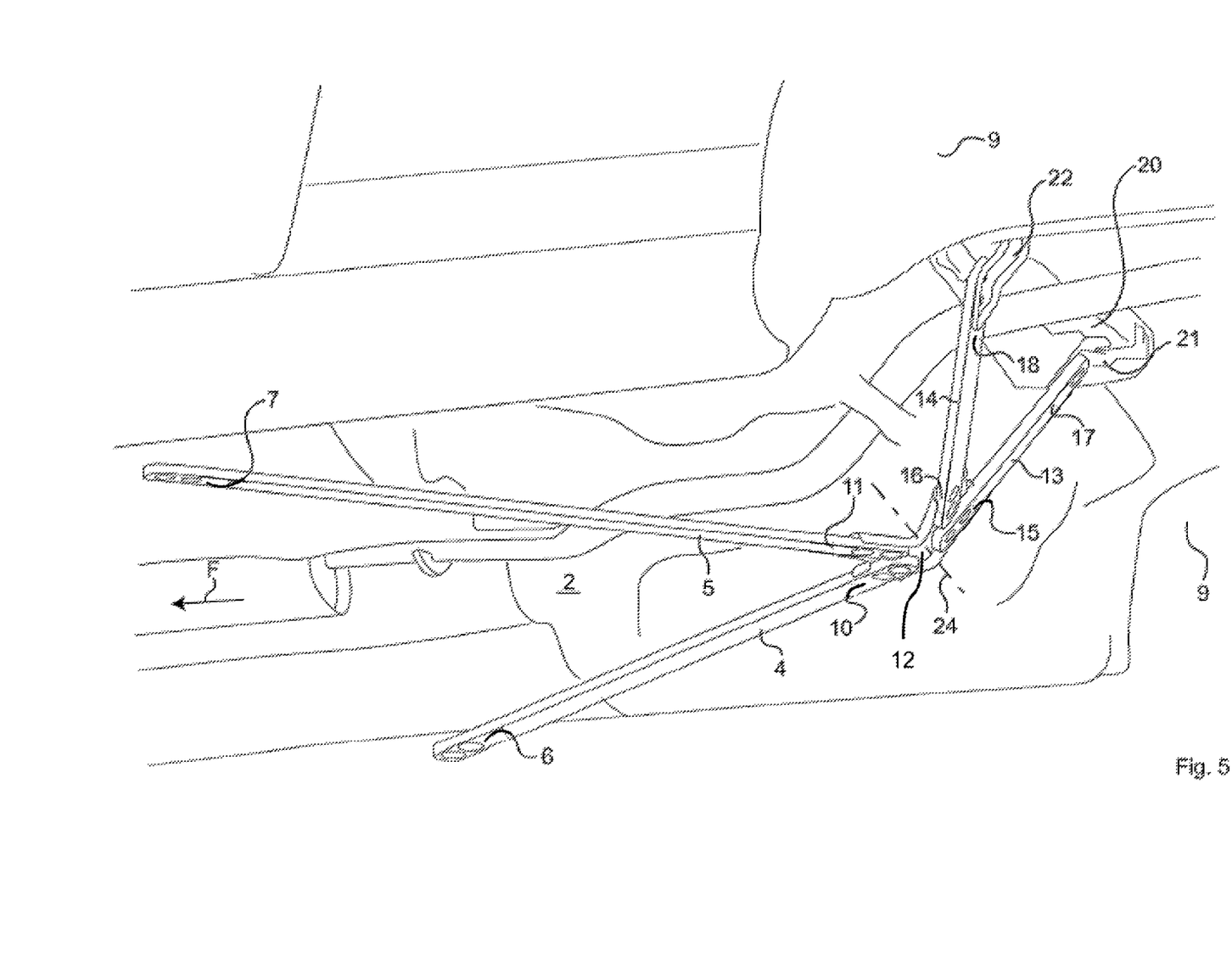
Figure 6:
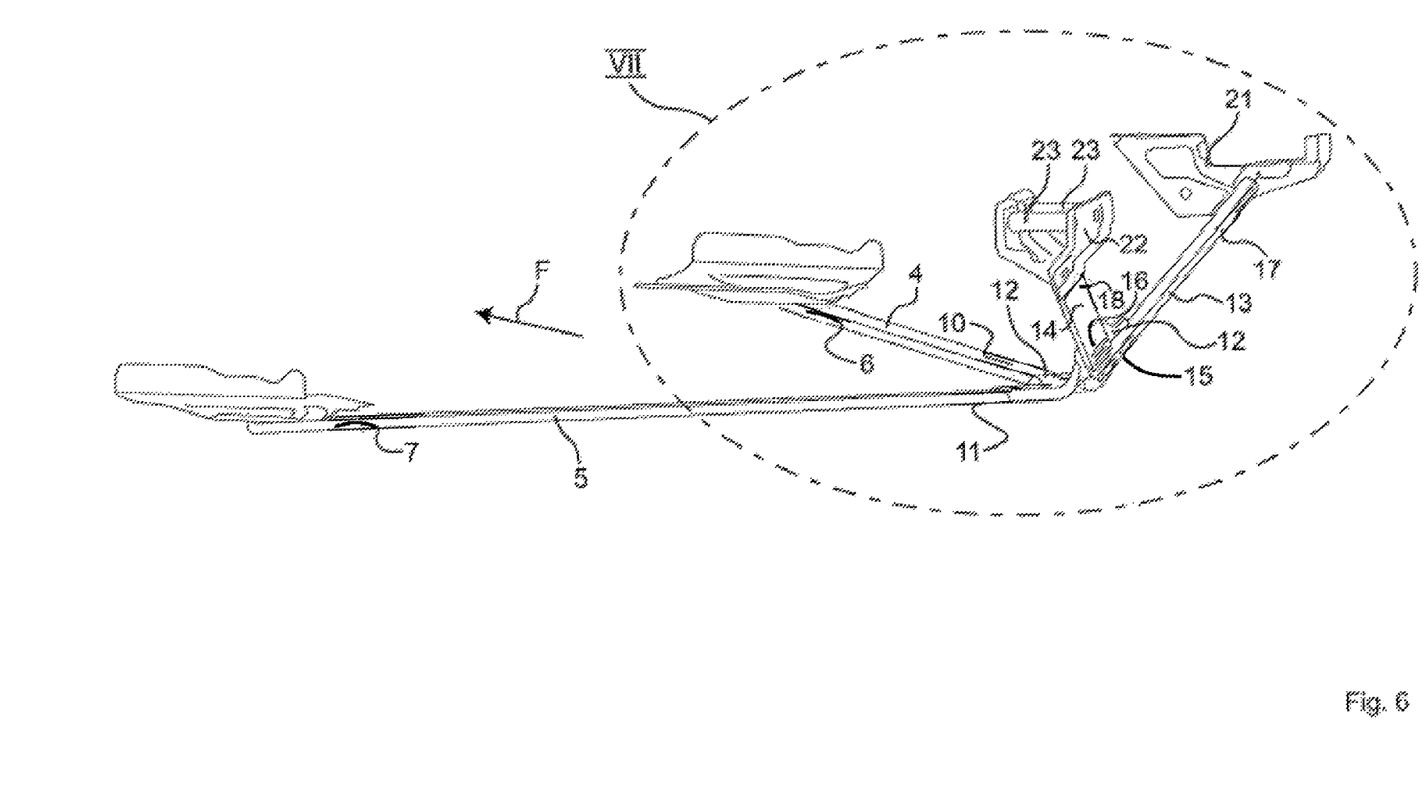

Here, the rear ends 10, 11 of the two struts 4, 5 lie transverse to the direction of travel F, in close proximity to each other; their transverse distance 8 (as seen in FIG. 4) is a maximum of 120 millimeters, and generally it is much less than 100 millimeters, in order to avoid a bending stress on the connection support 12.

Additionally, two further struts 13, 14 with their ends 15, 16 are held at the connection support 12, and extend with their ends 17, 18, facing away turning outwards from the vertical longitudinal mid-plane 3.

Thus the connection support 12 is held solely by the two strut pairs, 4, 5 and 13, 14 from the underbody 2, and otherwise is freely suspended. Further chassis connections are completely dispensable. The position of the connection support 12 can thus vary significantly, according to the geometry of an underbody 2, in particular, depending upon space conditions, it can be located either in front of or behind the rear axle. The struts 4, 5, 13, 14 are detachably held here to the connection support 12 via screw connections, so that a simple disassembly is possible, such as for an exchange of the exhaust system. The connection support 12 can also be built—not shown here—as one piece with one of the struts 4, 5, 13, 14, or with a strut pair 4, 5 or 13, 14.

Also, the transverse distance 19 of the ends 15, 16 of the additional struts 13, 14 at the connection support 12 is as small as possible, and amounts to clearly less than 120 millimeters, in the practical example less than 40 millimeters.

The further struts 13, 14, with the ends 17, 18 facing away, are fixed to the underbody 2 in an area of rigid sections, which are supporting and lying transverse to the direction of travel, such as at the spare wheel well, on lateral longitudinal supports, or—as here—on a transverse support 20.

Figure 7:
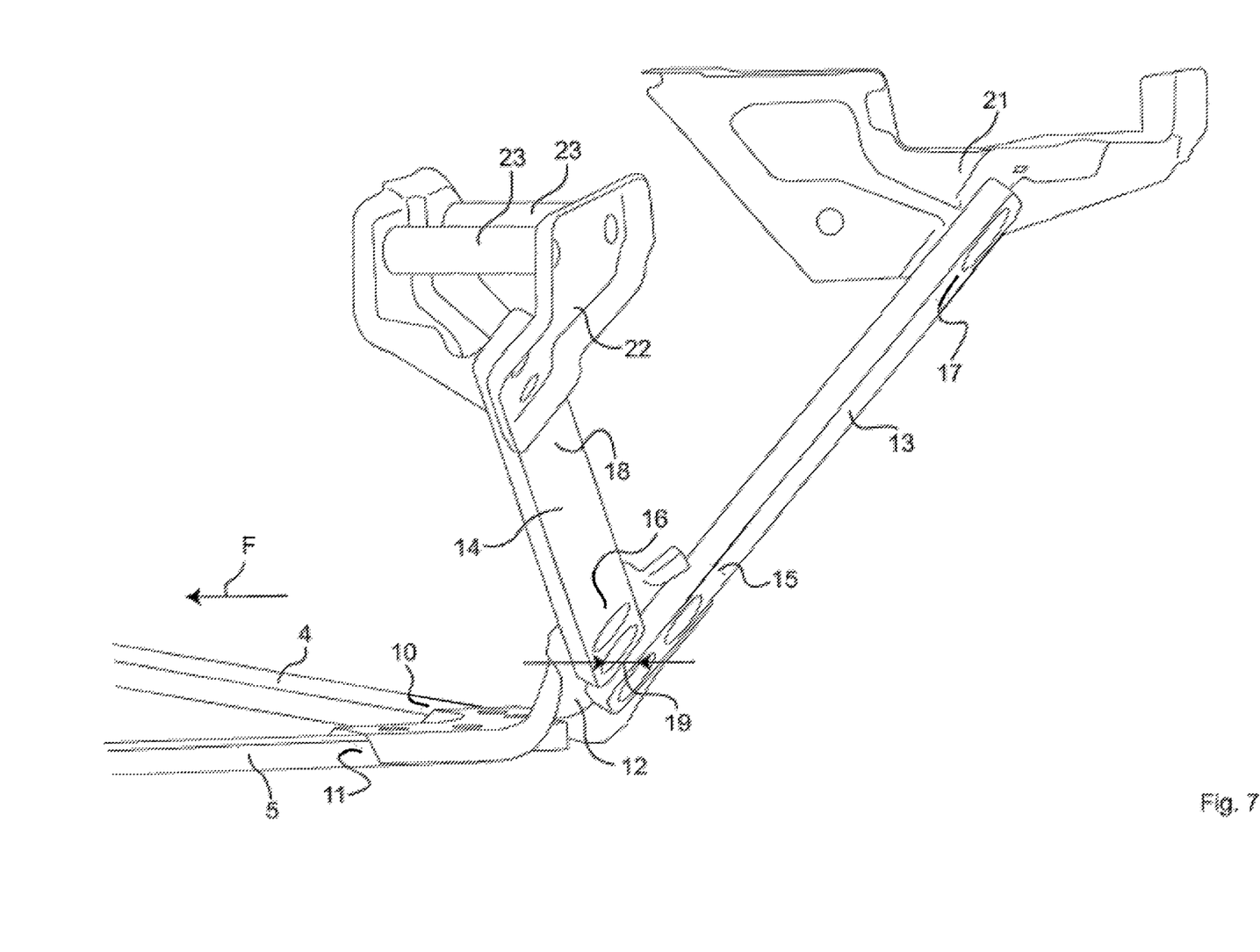

There the struts 13, 14 are fixed via connection flanges 21, 22 that at least partially surround the transverse support 20 on the front and back sides, and which, especially as is seen in FIG. 7, like the strut arrangement, need not be symmetrical. The flange 22 reaches around, for example, two bolts 23, which in the connection position lie horizontal and parallel to the longitudinal plane 3, which attach through the transverse support 20. Thus the struts 13, 14 are held particularly stable against elongation or compression force effects in their direction of extension. The ends 17, 18 of the struts 13, 14 end via the flanges 21, 22 also not parallel to the underbody, rather they rise nearly perpendicular to it, as can be seen in the example in FIG. 7. Therefore, during torsion a bending of these struts 13, 14 about their y-axis is necessary so that the struts 13, 14 can oppose this force effect with especially high resistance.

Figure 3:
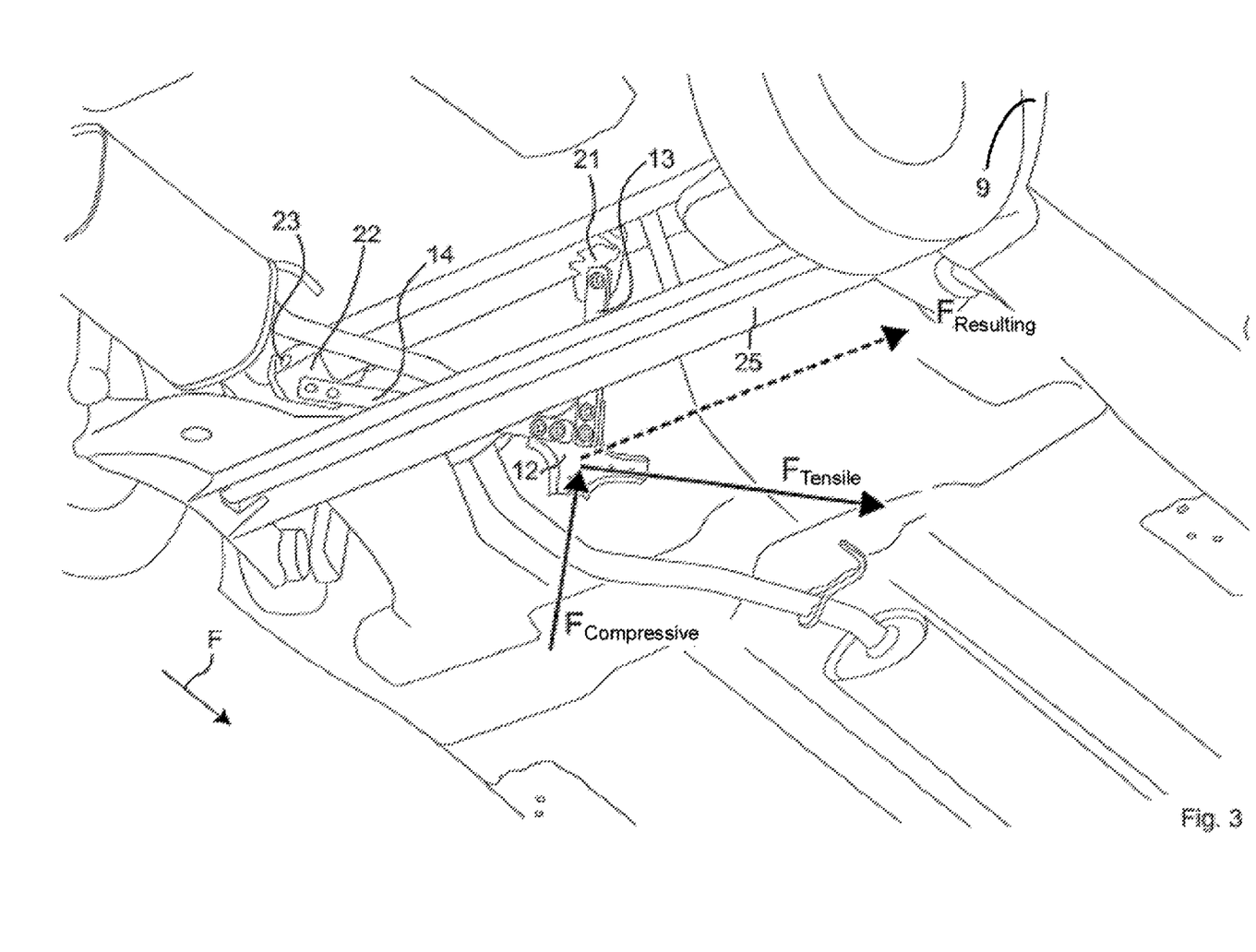

The connection support 12 can be formed by a flat body, angled about an axis 24 that is horizontal and transverse to the direction of travel F. Considered here, for example, is a steel body from ST 52 in a thickness of 5 millimeters. The support 12 can have, for example, dimensions of 10*30 millimeters. The angle lies between the connection points of the front struts 4, 5 and the rear struts 13, 14. Because in the practical example, a low lying rear axle 25 is provided, the resulting bending is a large angle of, for example, 60° to 80°, so that the rear struts 13, 14 can also be fixed, still before the rear axle, in the direction of travel, to the underbody 2—here to the transverse support 20. Also, foregoing a bending, or a bending of more than 90° is possible here, if the configuration of the underbody requires this. This results from the fact that the strut arrangement shown here is to function alone against torsion, and a reinforcement of the vehicle against bending need not be incorporated with it. As explained below using FIG. 3, during torsion, resulting forces occur only in the vehicle transverse direction and not in the vehicle longitudinal direction. Also, it is not necessary that the connection support 12 lie in the longitudinal mid-plane 3, rather an off-center position of some tens of millimeters is easily possible. The connection support 12 can be bent differently depending on the vehicle, and is therefore applicable to various vehicles.

In projection onto a plane that is bent corresponding to the bending about the axis 24, the struts 4, 5, 13, 14 result in nearly an X-shape that is very favorable for the torsional rigidity about a vehicle longitudinal axis, wherein the connection sheet metal 12 forms the vertex of the X.

During stimulation of a torsion of the vehicle 1 about a longitudinal axis by the fact, for example, that the right front vehicle area, in the direction of travel F, experiences an upward directed impulse, (FIG. 3), the strut 4 is subjected to a tensile force, whereas the opposing strut 5 is subjected to a compressive force. The resulting force acts completely in the vehicle transverse direction, so that no support in the vehicle longitudinal direction is needed. The resulting force is then counteracted by the two rear struts 13, 14, which are also fixed to areas of the underbody 2 that are rigid in the vehicle transverse direction, here to the transverse support 20. Also, the localization via the flanges 21, 22 is formed such that large forces in the vehicle transverse direction can be absorbed. In particular, the strut ends 17, 18 are fixed as far outward as possible at the underbody 2.

Figure 8:
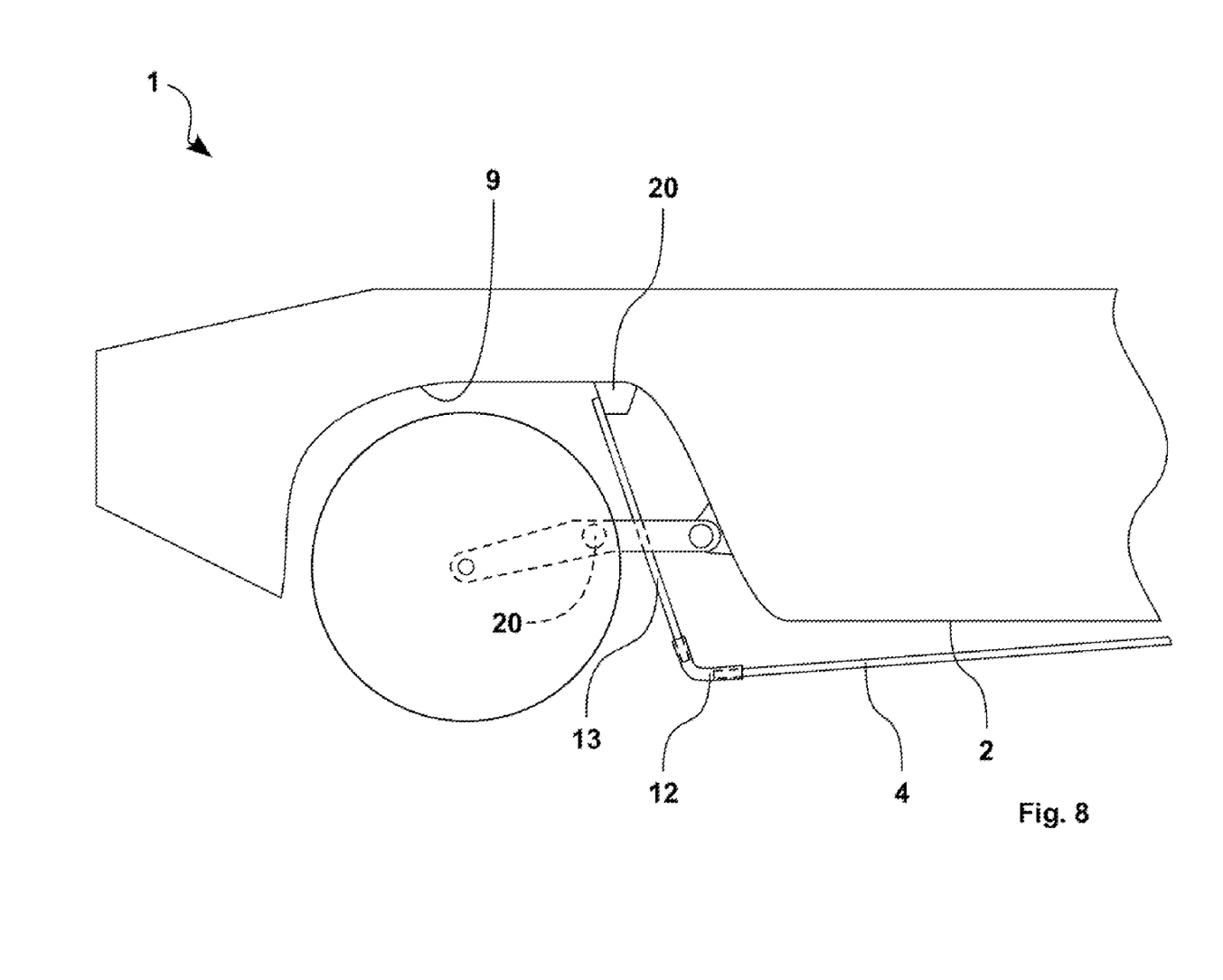

FIG. 8 is a side elevation view of the rear section of the vehicle illustrating the connection support 12 located in front of the rear axle 25, and the attachment of the rear struts 13, 14 to the transverse support 20 in front of the rear axle 25. FIG. 8 shows only one embodiment and other embodiments may be practiced.

The struts 4, 5 of the chassis can serve not only as customary reinforcement components, but also—not shown—as adaptive vibration dampers, i.e. that they, along with their passive reinforcement function, also enable an active influence on the vibration behavior of the chassis.

For this, the struts 4, 5 can respectively be built from multiple parts, and detect via piezoelectric crystals a change in length of the struts 4, 5, such as while driving over a pothole or a bump, and actively counteract this via actuators with a short response time.

The tensile or compressive force on the struts 4, 5 is detected by the receiving unit that contains, for example, compressive strain transducers, and is transformed into an electrical signal for the actuator, which counteracts the outside force. The two struts 4, 5 are then lengthened or contracted against each other in opposite phases by the actuators. Both struts 4, 5 thereby brace the chassis at the same time, and effect an active damping. With this, the effect of the outside stimuli is nearly cancelled. The actuator and the receiver unit have very short response times, so that the excitation frequencies of a few Hz up to 10 s of Hz can be effectively counteracted.

While the best modes for carrying out the invention have been described in detail, those familiar with the art to which this invention relates will recognize various alternative designs and embodiments for practicing the invention within the scope of the appended claims.

The invention claimed is:

1. A motor vehicle (1), comprising:
a motor vehicle chassis;
at least two reinforcing struts (4, 5) located below an underbody (2) of said chassis, each of which extends from a respective chassis attachment (6, 7) with a component in the direction of a vertical longitudinal mid-plane (3), wherein said chassis attachments are spaced by a first distance with respect to the vehicle transverse direction; and
a connection support (12) provided free under the underbody (2) and with a distance from the underbody (2), at which support said at least two struts (4, 5) are held at a second distance (8) smaller than said first distance with respect to the vehicle transverse direction, as well as two further struts (13, 14), which from there extend away, in each case, with a component in the direction of the vertical longitudinal mid-plane (3);
wherein the connection support (12) is angled about at least one axis (24) extending transverse to the longitudinal direction of the vehicle (1) between the mountings for said two struts (4, 5) and the mountings for said two further struts (13, 14);
wherein at the connection support, said two strut pairs (4, 5; 13, 14) are arranged behind one another and have, at least in projection onto a bent plane corresponding to the axis (24) of the connection support (12), a nearly x-shaped collective form;
wherein distal ends (17, 18) of said two further struts (13, 14) are fixed at a transverse support (20) to the chassis via connection flanges (21, 22) which at least partially encompass the front and rear sides of said transverse support (20).

2. Motor vehicle (1) according to claim 1,
wherein the second distance (8) of the mountings of the struts (4, 5) at the connection support (12) amounts in the vehicle transverse direction to less than 120 millimeters.

3. Motor vehicle (1) according to claim 1,
wherein said two further struts (13, 14) are held at the connection support (12) and distal ends (17, 18) of said two further struts (13, 14) are fixed, in each case, to one of a vehicle transverse support (20), a spare wheel well, or vehicle longitudinal supports.

4. Motor vehicle (1) according to claim 1,
wherein the struts (4, 5; 13, 14) of each strut pair, respectively, are held at a distance of less than 120 millimeters (8, 19) in the vehicle transverse direction at the connection support (12).

5. Motor vehicle (1) according to claim 1,
characterized in that the connection support (12) is held exclusively via said struts (4, 5; 13, 14) at the underbody (2), and the forces of the elongation and compression introduced in a chassis connection (6, 7; 17, 18) of said struts (4, 5; 13, 14) are cancelled within said struts (4, 5; 13, 14).

6. Motor vehicle (1) according to claim 1,
wherein said struts (4, 5; 13, 14) are fixable at the connection support (12) via screw connections.

7. A motor vehicle (1), comprising:
a motor vehicle chassis;
at least two reinforcing struts (4, 5) located below an underbody (2) of said chassis, each of which extends from a respective chassis attachment (6, 7) with a component in the direction of a vertical longitudinal mid-plane (3), wherein said chassis attachments are spaced by a first distance with respect to the vehicle transverse direction; and
a connection support (12) provided free under the underbody (2) and with a distance from the underbody (2), at which support said at least two struts (4, 5) are held at a second distance (8) smaller than said first distance with respect to the vehicle transverse direction, as well as two further struts (13, 14), which from there extend away, in each case, with a component in the direction of the vertical longitudinal mid-plane (3);
wherein the connection support (12) is angled about at least one axis (24) extending transverse to the vehicle (1) between the mountings for said two struts (4, 5) and the mountings for said two further struts (13, 14),
wherein the connection support (12) is located in front of a rear axle (25) in the direction of travel (F).

8. The motor vehicle (1) according to claim 7,
wherein ends (17, 18) of said two further struts (13, 14) are fixed at a transverse support (20) to the chassis via connection flanges (21, 22) which at least partially encompass the front and rear sides of said transverse support (20).

9. The motor vehicle (1) according to claim 7,
wherein the second distance (8) of the mountings of the struts (4, 5) at the connection support (12) amounts in the vehicle transverse direction to less than 120 millimeters.

10. The motor vehicle (1) according to claim 7,
wherein said at least two reinforcing struts and said two further struts (4, 5; 13, 14) held at the connection support (12) are guided in front of the rear axle (25) in the direction of travel (F) to their chassis connection (6, 7; 17, 18).

11. The motor vehicle (1) according to claim 10,
wherein ends (17, 18) of said two further struts (13, 14) are fixed at a transverse support (20) to the chassis via connection flanges (21, 22) which at least partially encompass the front and rear sides of said transverse support (20).

12. A motor vehicle (1), comprising:
a motor vehicle chassis;
at least two reinforcing struts (4, 5) located below an underbody (2) of said chassis, each of which extends from a respective chassis attachment (6, 7) with a component in the direction of a vertical longitudinal mid-plane (3), wherein said chassis attachments are spaced by a first distance with respect to the vehicle transverse direction; and
a connection support (12) provided free under the underbody (2) and with a distance from the underbody (2), at which support said at least two struts (4, 5) are held at a second distance (8) smaller than said first distance with respect to the vehicle transverse direction, as well as two further struts (13, 14), which from there extend away, in each case, with a component in the direction of the vertical longitudinal mid-plane (3);
wherein the connection support (12) is angled about at least one axis (24) extending transverse to the longitudinal direction of the vehicle (1) between the mountings for said two struts (4, 5) and the mountings for said two further struts (13, 14),
wherein said at least two reinforcing struts and said two further struts (4, 5; 13, 14) held at the connection support (12) are guided in front of a rear axle (25) in the direction of travel (F) to their chassis connection (6, 7; 17, 18).

13. The motor vehicle (1) according to claim 12,
wherein the second distance (8) of the mountings of the struts (4, 5) at the connection support (12) amounts in the vehicle transverse direction to less than 120 millimeters.

* * * * *